United States Patent [19]

Mahler et al.

[11] 4,163,579
[45] Aug. 7, 1979

[54] REINFORCING INSERT FOR A SUNVISOR FOR VEHICLES

[75] Inventors: Gert Mahler, Radevormwald; Lothar Viertel, Wuppertal; Wolfgang Meissner, Wetter, all of Fed. Rep. of Germany

[73] Assignee: Gebr. Happich GmbH, Wuppertal, Fed. Rep. of Germany

[21] Appl. No.: 807,586

[22] Filed: Jun. 17, 1977

[30] Foreign Application Priority Data

Jul. 22, 1976 [DE] Fed. Rep. of Germany ....... 2633002

[51] Int. Cl.² ............................................. B60J 3/00
[52] U.S. Cl. ................................................ 296/97 H
[58] Field of Search ............... 296/97 R, 97 H, 97 A, 296/97 B, 97 C, 97 D, 97 G, 97 J, 97 K; 224/29 A

[56] References Cited

U.S. PATENT DOCUMENTS

| 3,716,269 | 2/1973 | Herr | 296/97 H |
| 3,910,627 | 10/1975 | Meyer | 296/97 H |
| 4,000,404 | 12/1976 | Marcus | 296/97 H |

FOREIGN PATENT DOCUMENTS

| 2521823 | 11/1976 | Fed. Rep. of Germany | 296/97 H |
| 1441001 | 6/1976 | United Kingdom | 296/97 R |

*Primary Examiner*—Joseph F. Peters, Jr.
*Assistant Examiner*—John A. Carroll
*Attorney, Agent, or Firm*—Ostrolenk, Faber, Gerb & Soffen

[57] ABSTRACT

Vehicle sun visor having molded plastic reinforcing insert, with the insert including tension stays extending from the visor padding across the body of the insert and intersecting connecting stays.

9 Claims, 2 Drawing Figures

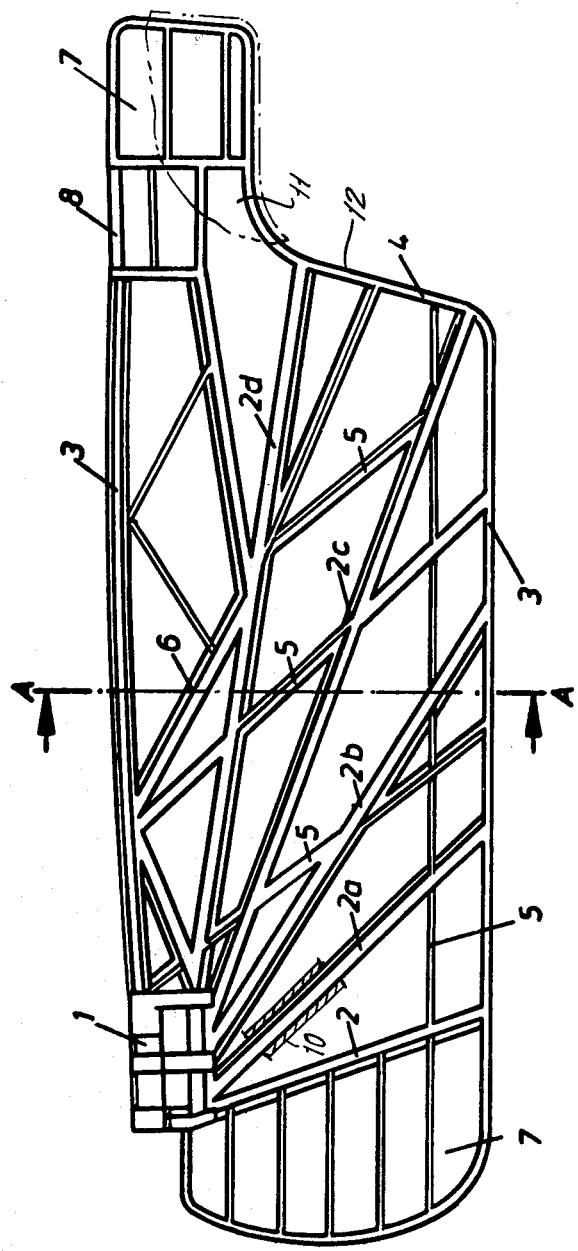

REINFORCING INSERT FOR A SUNVISOR FOR VEHICLES

FIELD OF THE INVENTION

The invention relates to a sun visor for vehicles, particularly a padded sun visor comprised of an injection molded elastic reinforcing insert covered by padding.

BACKGROUND OF THE INVENTION

For manufacturing reasons and also to obtain netlike reinforcing inserts, sun visor reinforcing inserts formerly made of wire are instead made from injection molded plastic inserts. The netlike reinforcing insert forms a bearing surface for the padding cover for the visor. The padding cover is larger in surface area than the wire frame. The larger bearing surface of a plastic reinforcing insert containing sun visor is beneficial when a person is thrown against the sun visor. First, such a sun visor is more stable and is not as easily destroyed as previous visors. Second, the passenger in a vehicle is better protected by the netlike constuction of the plastic insert than if the reinforcing insert were comprised only of a wire frame.

It has been found, both in practice and also experimentally, that standard plastic reinforcing inserts rapidly lose their strength when the temperature rises inside the vehicle. For example, inside temperatures of over 50° C. are measured during summer due to solar radiation, even in temperate zone latitudes. Although the plastic material is not softened by this heat, it eventually loses its bending strength. This fact has led to deformation of sun visors in the vehicles. Visors having only one pivot bearing sag at one end. Visors having two bearings, like hinged bearings, sag in the middle, particularly when the visor body is additionally weighted, as by a makeup mirror, parking dials or cases, e.g. for eyeglasses.

SUMMARY OF THE INVENTION

The object of the invention is to provide an injection-molded plastic reinforcing insert which maintains its inherent stability even under great load and at normally experienced temperatures.

This object is achieved according to the invention by providing the reinforcing insert with at least one, and more usually, several tension stays for absorbing tensile stress. The tension stays extend from the pivot bearing structure, which is located usually at one corner of the reinforcing insert, to the diametrally opposed region of the reinforcing insert. The tension stays radiate from the bearing structure and extend in the loading direction of the sun visor body. Thus, they are merely stressed for tension. The tension stays can absorb many different forces from different directions so that there is no deformation or sagging of the visor body, even under greater load.

DT-OS No. 1,955,674 shows an injection molded reinforcing insert for a sun visor body which has a network structure, when viewed as a whole. One or two stays extend from the bearing point of the visor to the opposite edge. These stays can be stressed for tension in this region, and they absorb even major forces without losing their shape. But, the course or pathway over which these stays extend is randomly determined in a particular network structure. Over half of the reinforcing insert is not affected by the tension stays extending from the visor support region, so that this region can be deformed even by minor forces in the above described manner, because only bending moments appear.

The bearing structure is integral with the reinforcing insert. Since the bearing structure has a certain length, it is possible to arrange several tension stays distributed over this length and to conduct them substantially equally spaced to the diametrally opposed region of the reinforcing insert. However, it seems more expedient to conduct the tension stays, starting from the bearing structure, and widening radially, to the diametrally opposed region of the reinforcing insert adjoining on both sides. In this way, a larger area, or even the entire area of the visor, from the bottom edge and partly including the lateral edge, is protected against deformation.

The tension stays are stabilized among each other. The network structure of the reinforcing insert is made narrower-meshed if the reinforcing insert is also equipped with connecting stays, which at least partly intersect the tension stays that start from the bearing structure.

Since the reinforcing insert also has zones which are usually not subject to any bending stress or which are secured against bending stress by the tension and connecting stays, it is possible to fill the reinforcing insert with lattice regions whose form and structure are known.

As another advantageous feature, the tension and connecting stays may each have an L-, U- or Z-shaped cross section. This cross sectional form increases the bending strength of the stays. Further, the surfaces of the respective bottom and head beams of the Z-shaped design form wide bearing surfaces for receiving the padding and in a possible impact. The free ends of the L- or U-shaped stays which extend in the direction toward the surface of the reinforcing insert, such as the head end of the L-shaped stay or both leg ends of the U-shaped stay, preferably terminate before the surface of the reinforcing insert, so that these relatively narrow edges of the insert find no direct support on the padding and the latter is therefore protected.

Although a particularly stable reinforcing insert for a sun visor is obtained by the shape alone and by the pathway of the tension and connecting stays, it may be advisable, in order to absorb extreme loads and to obtain protection against particularly high temperatures, if one or several tension stays have a sheath of a material that increases the tensile strength, such as metal or textile strands.

BRIEF DESCRIPTION OF THE DRAWINGS

Other features of the invention are described below in conjunction with the accompanying drawings.

FIG. 1 shows a top view of the surface of a reinforcing insert for a sun visor.

FIG. 2 shows a section along line A-A according to FIG. 1.

DESCRIPTION OF A PREFERRED EMBODIMENT

A visor body includes an outer surface 11 and the interior visor body reinforcing supporting structure illustrated. The visor body includes the peripheral side edges 3, 12, 13 with the edges 13 and 12 intersecting. This reinforcing structure includes a pivot bearing structure 1 located at one visor side edge 12 near the intersection with the side edge 13. From pivot bearing structure 1, there originate five one-piece straight tension stays 2, 2a, 2b, 2c and 2d. They radiate outwardly from and widen apart as they extend away from the bearing structure 1 completely across and they terminate in the lower region of edge 3 and in the lateral frame region 4.

At least one or more of the tension stays may be sheathed or armored, as at 10 on stay 2a, with a metal layer or textile strands to increase the tensile strength of the sheathed stays.

The tension stays 2b, 2c, 2d are intersected by connecting stays 5 in their course and are thereby connected with each other, so that the tension stays 2b, 2c, 2d are stabilized among each other and with lower edge 3 and frame region 4. In addition, a fine meshed network structure is formed. Tension stay 2d is connected by additional intermediate stays 6 with the bearing side of upper edge 3.

At one side of the visor body, a side or tip region 7 of known form adjoins the tension stay 2. At the opposite side of the visor body, there is a second side or tip region 7 that is arranged in the region close to trapping bearing 8. It is slightly different in design from, but equal in nature to, the first side or tip region. The stays 2 and 5 do not extend into these tip regions as they are not usually stressed or subject to forces that deform them.

As can be seen from FIG. 2, the cross section of the stays and of the elements of the frame are different. Upper edge 3 is U-shaped. The intermediate stays 6 and the tension stays 2b, 2c and 2d are Z-shaped, and the connecting stays 5 are L-shaped.

FIG. 2 also shows that the head end of the L-shaped stay and one leg end of the U-shaped edge 3 do not extend into the surface of the reinforcing insert.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor for a vehicle, including a visor body and a reinforcing insert inserted in said visor body; said reinforcing insert being comprised of a plastic material; said body having a number of side edges and having surfaces joining said side edges; a pivot bearing for said visor body and located at one said side edge and near an intersecting one of said side edges; said reinforcing insert comprising a plurality of tension stays extending from said pivot bearing along different respective pathways that widen apart moving away from said pivot bearing to respective regions of said reinforcing insert; said regions being at the side of said body away from and diametrally opposite said pivot bearings;

said tension stay pathways start from said pivot bearing and widen radially as they extend to said diametrally opposite regions.

2. The sun visor of claim 1, wherein said reinforcing insert further comprises a plurality of connecting stays extending between said tension stays, and at least some of said connecting stays intersecting and crossing a said tension stay, with at least one said connecting stay starting from the vicinity of said pivot bearing.

3. The sun visor of claim 2, wherein said visor body includes tip regions near opposite said edges; none of said tension and said connecting stays extends into said tip regions.

4. The sun visor of claim 2, wherein at least some of said stays have a U-shaped cross-section, with the legs of the U extending toward a said surface of said sun visor.

5. The sun visor of claim 4, wherein said stay legs which extend toward a said surface of said visor are of a length to terminate short of the respective said surface of said visor.

6. The sun visor of claim 2, wherein at least some of said stays have an L-cross section, with one leg of the L extending toward a said surface of said visor.

7. The sun visor of claim 6, wherein said stay legs which extend toward a said surface of said visor are of a length to terminate short of the respective said surface of said visor.

8. The sun visor of claim 2, wherein at least some of said stays have a Z-shaped cross section, with the end legs of the Z extending parallel to the adjacent said surface of said visor body.

9. The sun visor of claim 2, wherein at least one of said tension stays is sheathed for increasing its tensile strength.

* * * * *